(12) United States Patent
Feger (10) Patent No.: US 7,287,389 B2
(45) Date of Patent: Oct. 30, 2007

(54) FEEDING ENERGY TO A GAS TERMINAL FROM A SHIP FOR TRANSPORTING LIQUEFIED GAS

(75) Inventor: Damien Feger, Vernon (FR)

(73) Assignee: Snecma Moteurs, Paris (FR)

( * ) Notice: Subject to any disclaimer, the term of this patent is extended or adjusted under 35 U.S.C. 154(b) by 446 days.

(21) Appl. No.: 10/804,634

(22) Filed: Mar. 19, 2004

(65) Prior Publication Data
US 2004/0182090 A1    Sep. 23, 2004

(30) Foreign Application Priority Data
Mar. 20, 2003   (FR) .................................. 03 03430

(51) Int. Cl.
*F17C 13/08* (2006.01)

(52) U.S. Cl. ........................ 62/53.2; 114/74 R; 307/19

(58) Field of Classification Search ................ 62/50.2, 62/53.2, 48.3, 50.1, 50.7, 7; 114/74 R; 307/19
See application file for complete search history.

(56) References Cited

U.S. PATENT DOCUMENTS

| | | | |
|---|---|---|---|
| 2,903,860 A | | 9/1959 | Brown |
| 3,768,271 A | * | 10/1973 | Denis .......................... 62/50.3 |
| 3,864,918 A | * | 2/1975 | Lorenz ......................... 60/651 |
| 5,878,814 A | * | 3/1999 | Breivik et al. ............... 166/267 |
| 6,230,809 B1 | * | 5/2001 | Korsgaard .................... 166/352 |
| 6,329,725 B1 | * | 12/2001 | Woodall et al. ................ 307/19 |
| 2002/0073619 A1 | * | 6/2002 | Perkins et al. ................. 48/190 |
| 2002/0174662 A1 | * | 11/2002 | Frimm et al. ................. 62/50.2 |

FOREIGN PATENT DOCUMENTS

| | | |
|---|---|---|
| DE | 539 478 C | 11/1931 |
| FR | 1 481 495 A | 5/1967 |
| FR | 2 722 760 A | 1/1996 |
| WO | WO 99 47869 A | 9/1999 |
| WO | WO 01 03793 A | 1/2001 |

OTHER PUBLICATIONS

Ribesse, J. Ed, Association des Ingenieurs Electriciens Sortis de l'Institut Montefiore: "Recuperation cycles of the cold energy contained in liquefied natural gas," Journees Internationales D'Etude Des Centrales Electriques Modernes. Liege, A.I.M., BE, vol. 2 session 8, Oct. 26, 1981, pp. 3801-3808.

* cited by examiner

*Primary Examiner*—Mohammad M. Ali
(74) *Attorney, Agent, or Firm*—Weingarten, Schurgin, Gagnebin & Lebovici LLP (57) ABSTRACT

The invention relates to feeding a gas terminal with energy from a ship transporting liquefied gas while said liquefied gas is being transferred between a tank of the ship and a tank of the gas terminal, wherein a portion of the energy produced by the propulsion system of the ship is delivered to the gas terminal.

29 Claims, 8 Drawing Sheets

FEEDING ENERGY TO A GAS TERMINAL FROM A SHIP FOR TRANSPORTING LIQUEFIED GAS

This application claims priority to a French application No. 03 03430 filed Mar. 20, 2003.

FIELD OF THE INVENTION

The present invention relates to the general field of transferring a liquefied gas between a ship and a gas terminal, and it relates more particularly to a method of feeding the gas terminal with energy from the ship, and to the corresponding means for implementing the method.

BACKGROUND OF THE INVENTION

It is known that natural gas can be transferred in the form of vapor or liquid via specific interfaces between a ship and a gas terminal.

Figure 7:
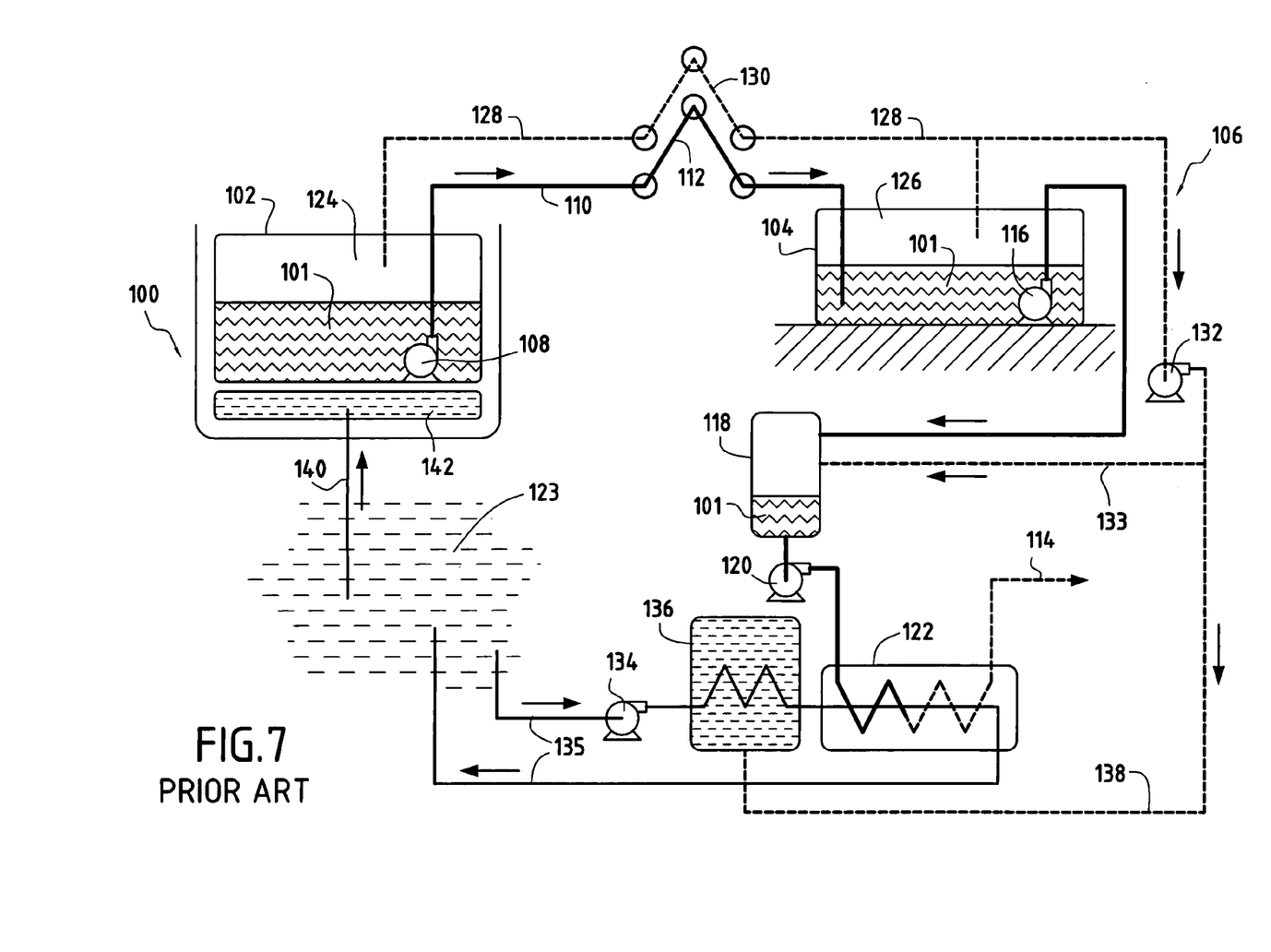
FIG. 7 is a highly diagrammatic view of a prior art circuit for unloading liquefied gas from a ship transporting said liquefied gas to a gas terminal.

FIG. 7 is a simplified diagram of a prior art gas unloading circuit.

Liquefied gas 101 transported in a tank 102 of a ship 100 is discharged to a tank 104 of a gas terminal 106 by a pump 108 immersed in the tank 102 of the ship 100. The liquefied gas is delivered into the tank 104 of the gas terminal via a circuit 110 including a loading arm 112 to allow for a certain amount of freedom of movement between the ship 100 and the gas terminal 106.

Depending on the feed requirement of a gas pipeline 114 fed with gas at high pressure, the liquefied gas 101 contained in the tank 104 of the gas terminal 106 is transferred by a pump 116 immersed in the tank 104 to a condenser 118. Thereafter, a high pressure pump 120 delivers the liquefied gas 101 to a heat exchanger 122 so as to cause it to be re-gasified prior to being delivered at substantially ambient temperature to the pipeline 114.

In addition, the gas ceiling 124 inside the tank 102 and the gas ceiling 126 inside the tank 104 are interconnected by a low pressure natural gas vapor circuit 128 via an arm 130. This enables the pressure in the two gas ceilings 124 and 126 to be controlled.

Heat entering into the tanks 102 and 104 causes the liquefied gas to evaporate, leading to excess natural gas vapor. A portion of the excess vapor can be taken from the circuit 128 by a low pressure compressor 132 which delivers it via a circuit 133 to the condenser 118 where it is reliquefied.

Furthermore, in order to ensure that the liquefied natural gas is re-gasified in the heat exchanger 122, sea water 123 is taken by a pump 134 via a circuit 135, and possibly heated using immersed burners 136 fed with natural gas vapor by a circuit 138, prior to being returned to the sea 123.

However, that transfer architecture consumes a large amount of gas in pure loss, leading to ecological harm as well as to a loss of revenue.

To solve that kind of problem, there exist gas terminals including installations for co-generation of energy, but they are very expensive.

Finally, while unloading its cargo, the ship 100 takes in sea water 123 via a circuit 140 to fill its ballast tanks 142 so as to ensure that the draft and the trim of the ship 100 are appropriate.

Figure 8:
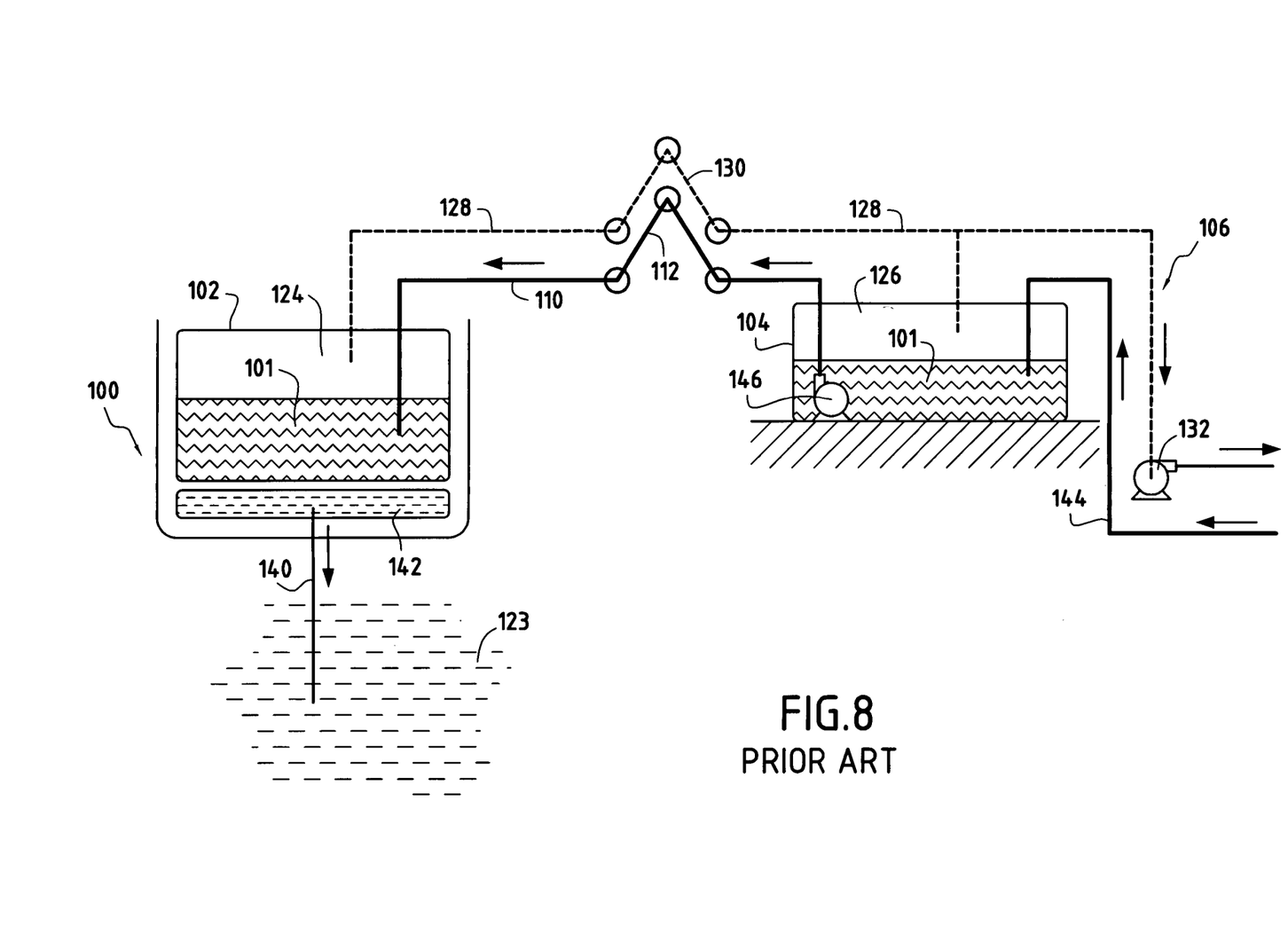
FIG. 8 is a highly diagrammatic view of a prior art circuit for loading liquefied gas from a gas terminal onto a ship for transporting said liquefied gas.

FIG. 8 shows a simplified diagram of a prior art liquefied gas loading circuit. In this example, the liquefied gas produced by a liquefaction plant (not shown) is conveyed via a circuit 144 into a storage tank 104 of a gas terminal 106 from which it is taken by an immersed pump 146 for sending via a circuit 110 to a tank 102 on board a ship 100.

Similarly, a compressor 132 extracts, from a circuit 128, excess natural gas vapor generated by ingress of heat, and delivers it to the liquefaction plant.

Finally, while loading its cargo, the ship 100 empties out the sea water that it initially contained in its ballast tank 142 via a circuit 140 so as to ensure that the draft and the trim of the ship 100 are appropriate.

The sea water used in the ballast tanks of the ship or in the heat exchangers used for re-gasifying liquid natural gas in the gas terminal leads to corrosion in the ballast tanks and in the heat exchangers.

In addition, sea water causes sediment to be deposited in the ballast tanks 142 which leads subsequently to large expense for its removal.

OBJECT AND SUMMARY OF THE INVENTION

The present invention thus proposes to mitigate the above-mentioned drawbacks by proposing a method of transferring liquefied gas between a ship and a gas terminal, which method optimizes the use of installations in order to improve performance both economically and ecologically.

Another object of the invention is to avoid corrosion and deposits of sediment in the ballast tanks of the ship.

These objects are achieved by a method of feeding energy to a gas terminal from a ship transporting liquefied gas while said liquefied gas is being transferred between a tank of the ship and a tank of the gas terminal, wherein a portion of the energy produced by the propulsion system of the ship is supplied to the gas terminal.

Thus, advantage is taken of the propulsion system of the ship which is used as a co-generator unit supplying energy to the gas terminal, thereby optimizing economic and ecological performance. This solution is very economical because the required investment has already been made to a large extent for the purpose of propelling the ship itself, and consequently the gas terminal does not need to have its own co-generation installation.

Advantageously, excess gas vapor in the gas ceiling of the tank of the ship and in the gas ceiling of the tank of the gas terminal is used for feeding to the propulsion system of the ship.

In a preferred aspect of the invention, the heat produced by the propulsion system of the ship is used for feeding heat to at least one heat exchanger disposed in the gas terminal.

A first heat exchanger may be fed from a cooling circuit of the engine of the ship's propulsion system.

A second heat exchanger may be fed from a heat transfer circuit engaging the exhaust gases from the engine of the ship's propulsion system.

Advantageously, the heat given off by the first heat exchanger and/or by the second heat exchanger is used to re-gasify the liquefied gas after it has been unloaded from the ship's tank to the tank of the gas terminal.

In a particular aspect of the invention, at least one positive energy recovery cycle is formed between a cold source associated with the re-gasification and a hot source associated with the first heat exchanger and/or with the second heat exchanger.

After being re-gasified, the gas may be heated by an additional heat exchanger.

In another aspect of the invention, while liquefied gas is being unloaded from the ship to the gas terminal, ballast tanks of the ship are filled with water supplied by the gas terminal.

The water supplied by the gas terminal may be sea water that has settled in a basin.

In a variant, the water supplied by the gas terminal may be fresh water stored in a basin.

Advantageously, the heat produced by the propulsion system of the ship is used for heating the water in the basin so that the basin can be used to store heat.

The heat stored in the water basin may be used in the gas terminal to re-gasify the liquefied gas.

While liquefied gas is being loaded from the gas terminal onto the ship, the water present in the ballast tanks of the ship is delivered to the gas terminal.

The water delivered to the gas terminal may be used as a cooling fluid in a heat exchanger in the gas terminal.

In yet another aspect of the invention, a determined portion of the electrical power supplied by the propulsion system of the ship is used for feeding electricity to the gas terminal.

The liquefied gas may be liquefied natural gas or liquefied petroleum gas.

The invention also provides a ship comprising a tank for transporting liquefied gas, a propulsion system, and means for transferring the liquefied gas between the tank of the ship and a tank of a gas terminal, the ship further including at least one interface for feeding a heat transfer fluid to supply heat to the gas terminal.

A first heat transfer fluid feed interface is used to cause the cooling fluid of the engine of the ship's propulsion system to circulate through a first heat exchanger disposed in the gas terminal.

A second heat transfer fluid feed interface serves to cause the cooling fluid for cooling the exhaust gases from the engine of the ship's propulsion system to circulate through a second heat exchanger disposed in the gas terminal.

In a particular aspect of the invention, the ship further comprises a ballast water interface enabling water to be transferred between the ship and the gas terminal.

In yet another particular aspect of the invention, the ship further comprises an interface for supplying electrical power that enables the gas terminal to be fed with electricity.

The invention also provides a gas terminal including at least one tank for storing liquefied gas and transfer means for transferring the liquefied gas between said tank and a tank of a ship for transporting liquefied gas, the terminal further comprising at least one interface for receiving a heat transfer fluid from the ship.

According to a particular aspect of the invention, the gas terminal further comprises a water interface enabling water to be transferred between the ship and the gas terminal.

According to yet another particular aspect of the invention, the gas terminal further comprises an interface for receiving electrical power enabling the gas terminal to be fed with electricity from the ship.

BRIEF DESCRIPTION OF THE DRAWINGS

Other features and advantages of the method and the apparatus of the invention appear on reading the following description given by way of non-limiting indication and made with reference to the accompanying drawings, in which.

DETAILED DESCRIPTION OF EMBODIMENTS

In accordance with the invention, highly diagrammatic FIGS. 1 to 6 show circuits for feeding energy to a gas terminal 206 from a ship 200 transporting liquefied gas 201 while transferring said liquefied gas 201 between a tank 202 of the ship 200 and a tank 204 of the gas terminal 206.

The ship 200 has a propulsion system 250 which produces energy, and a determined portion of this energy is delivered to the gas terminal 206.

By way of example, the liquefied gas 201 may be liquefied natural gas, in which case the ship is a methane tanker and the gas terminal is a methane terminal. The liquefied gas 201 could also be liquefied petroleum gas.

Figure 1:
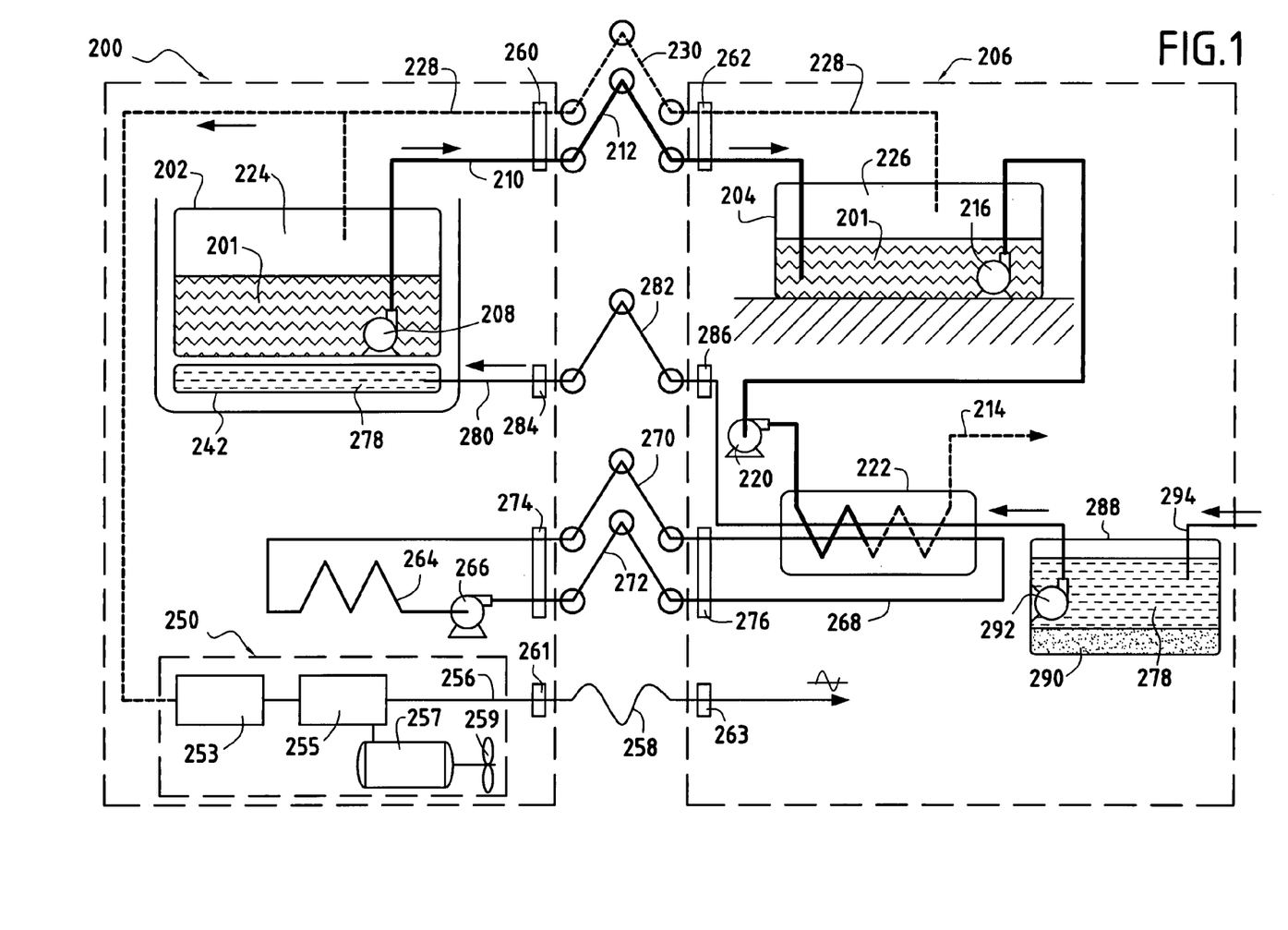
FIG. 1 is a highly diagrammatic view of a circuit in accordance with the invention for unloading liquefied gas from a ship for transporting liquefied gas to a gas terminal, showing that energy produced by the propulsion system of the ship is delivered to the gas terminal.

FIG. 1 is a highly diagrammatic view of a circuit for unloading liquefied gas 201 from the ship 200 for transporting said liquefied gas to the gas terminal 206.

The liquefied gas 201 transported in the tank 202 of the ship 200 is unloaded to a tank 204 of the gas terminal 206 via liquefied gas transfer means.

The transfer means comprises a liquefied gas circuit 210 including a loading arm 212 and another circuit 228 for gas vapor and including another loading arm 230. The loading arms 212 and 230 allow a degree of freedom of movement between the ship 200 and the gas terminal 206 and they are connected between a gas transfer interface 260 on board the ship 200 and another gas transfer interface 262 at the gas terminal 206.

The transfer means also comprise a pump 208 which may be immersed in the tank 202 of the ship 200 and which delivers the liquefied gas present in said tank 202 to the tank 204 of the gas terminal 206.

In addition, the circuit 228 connects the gas ceiling 224 of the tank 202 to the gas ceiling 226 of the tank 204 so as to control vapor pressure in the gas ceilings 224 and 226.

Advantageously, excess gas vapor in the gas ceiling 224 of the tank 202 of the ship 200 and in the gas ceiling 226 of the tank 204 of the gas terminal 206 can be used for feeding the propulsion system 250 of the ship 200 via a circuit 228.

In this example, the propulsion system 250 of the ship 200 is based on using a diesel or gas turbine type engine 253 suitable for being fed with gas vapor for driving one or more alternators 255 powering one or more electric motors 257 driving one or more propellers 259.

By making use of the excess gas vapor due to inflow of heat as fuel for generating electricity on board the ship 200 while it is unloading serves to avoid the need to use a compressor 132 and a condenser 118 for evacuating said gas (see prior art FIG. 7).

Depending on the feed requirements of a gas pipeline 214 fed with gas at high pressure, the liquefied gas 201 contained in the tank 204 of the gas terminal 206 is transferred by means of a pump 216 immersed in the tank 204 to a high pressure pump 220 delivering said liquefied gas 201 to a heat exchanger 222 where it is re-gasified prior to being delivered substantially at ambient pressure to the pipeline 214.

The heat produced by the propulsion system 250 of the ship 200 is used for feeding heat to the heat exchanger 222 located in the gas terminal 206.

The propulsion system 250 of the ship 200 is then being used as a co-generation unit supplying the gas terminal 206 with a heat transfer fluid.

The heat produced by the diesel or gas turbine engine 253 may be picked up by a cooling circuit 264 of said engine 253 and fed by means of a pump 266 to a heat transfer fluid network 268, e.g. using pressurized water or some other fluid, which feeds hot fluid to the heat exchanger 222 for performing re-gasification, with feed taking place via arms or hoses 270 and 272.

The arms or hoses 270 and 272 are connected between a heat transfer fluid feed interface 274 on board the ship 200 and a heat transfer fluid receiving interface 276 at the gas terminal 206.

Thus, the feed interface 274 serves to cause the cooling fluid of the engine 253 of the ship's propulsion system 250 to flow through the heat exchanger 222.

Consequently, it is possible to reduce or even eliminate the need to take in sea water heated by immersed burners 136 (see prior art FIG. 7) once a ship is connected to the gas terminal.

These co-generation means of the invention enable installations to be optimized, thereby improving economic and ecological performance since the necessary investment has already been made to a large extent for the purpose of propelling the ship itself, and the gas terminal does not need its own co-generation installation.

In another aspect of the invention, a determined portion of the electrical power delivered by the propulsion system 250 of the ship 200 is used for feeding electricity to the gas terminal 206.

During unloading, it is possible to make use of the electricity produced by the alternator(s) 255 of the ship 200 by coupling them via an electrical circuit 256 to the power network of the gas terminal 206. The electrical circuit 256 includes a flexible connection 258 between an electrical power supply interface 261 on board the ship 200 and an electrical power receiving interface 263 at the gas terminal 206.

In general, the electrical power needed for propelling the ship 200 is five to ten times greater than that needed for loading or unloading its cargo, where the main requirements relate to powering the immersed pumps 208, and they consume much less power than the main motors 257 when the ship 200 is under way.

Thus, excess gas vapor coming from ingress of heat is converted directly into electricity which is used either for the ship's own requirements, or else via the circuit 256 to deliver electricity to the local network, and in particular to power the high pressure pumps 220 of the gas terminal 206.

Consequently, the propulsion system 250 of the ship 200 is used as a co-generation unit supplying the gas terminal 206 not only with heat energy, but also with electrical power.

According to yet another aspect of the invention, while unloading liquefied gas 201 from the ship 200 to the gas terminal 206, the ballast tanks 242 of the ship are filled with water 278 supplied by the gas terminal 206 and not with sea water.

The water 278 is supplied by the gas terminal 206 via a feed circuit 280 connected to the ship 200 via a loading arm or a hose 282. The loading arm is connected between a ballast water interface 284 on board the ship 200 and a water interface 286 at the gas terminal 206. These water interfaces 284 and 286 enable water 278 to be transferred between the gas terminal 206 and the ship 200.

In addition, the feed circuit 280 may be used for feeding the heat exchanger 222 with heat in order to re-gasify the liquefied gas.

This device makes it possible for ballasting to be performed with sea water that can previously have settled in a basin 288 thus allowing sediment 290 to be deposited, thereby enabling clean water 278 to be fed via a pump 292 to the heat exchanger 222 and then to the ballast tanks 242 of the ship 200.

Alternatively, and if the corresponding resources are available, the water 278 may be fresh water stored in the basin 288 and fed in by a circuit 294. Most unloading gas terminals are in geographical regions where fresh water resources are abundant.

Replacing sea water by sea water that has settled or by fresh water presents several advantages.

The deposition of sediment in the ballast tanks 242 is thus avoided giving rise to considerable savings. For example, a ship may collect up to 1000 (metric) tons per year of sediment in its ballast tanks.

In addition, the use of fresh water not only reduces corrosion in the ballast tanks of the ship, thereby reducing maintenance costs, but it also makes it possible to load the ship at unloading gas terminals with water that has commercial value. This is because the loading terminals in countries that export natural gas or liquefied petroleum are for the most part situated in regions that are arid or deserts.

Figure 2:
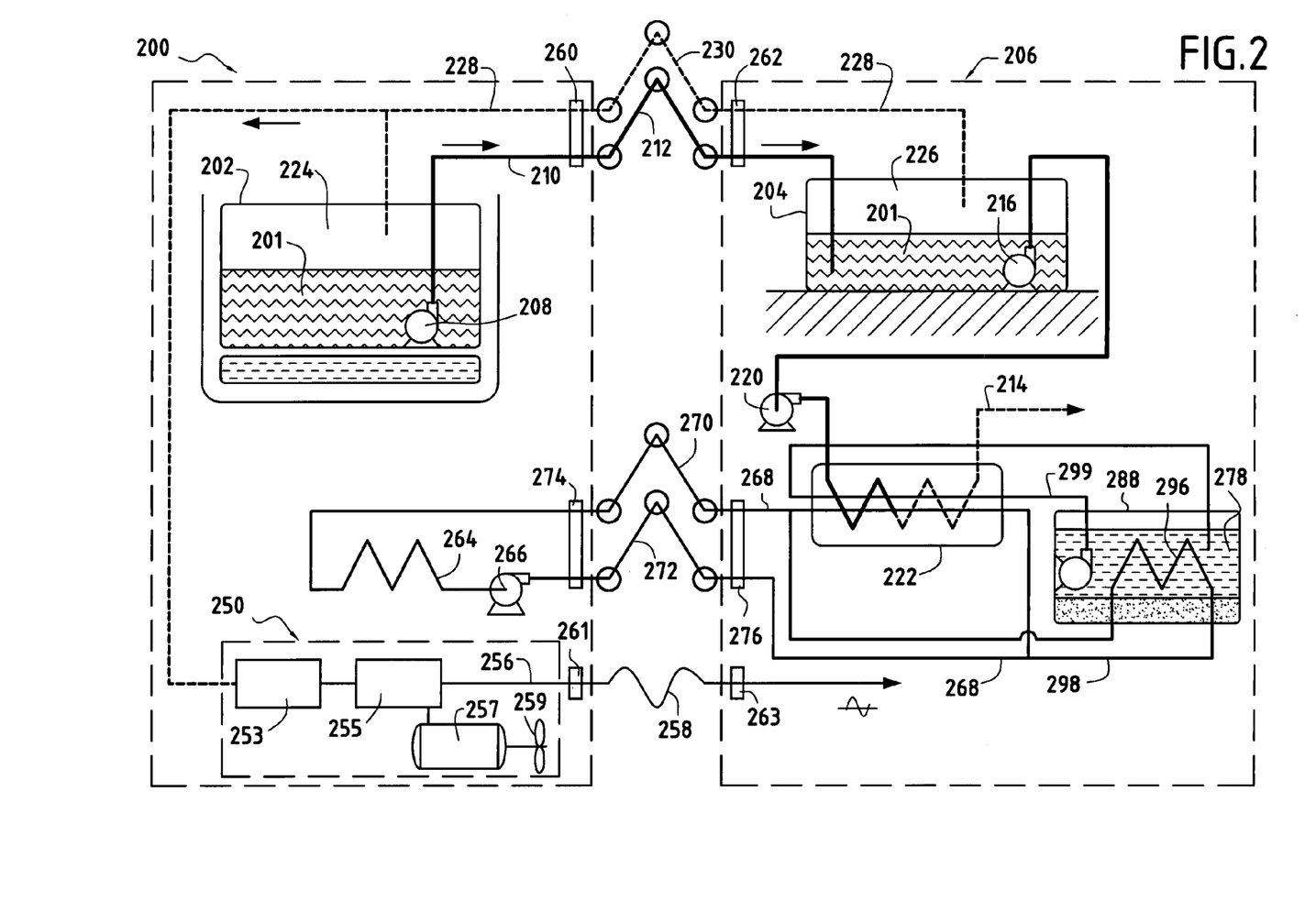
FIG. 2 shows a first variant of FIG. 1 in which the heat produced by the propulsion system of the ship can be used for heating water in a basin.

FIG. 2 shows a first variant in which the heat produced by the propulsion system 250 of the ship 200 can be used for heating the water 278 in the basin 288 so that the basin can be used to store heat.

Thus, in order to cover the hot water requirements, of the gas terminal 206 when it needs to deliver gas in the absence of a ship 200, the basin 288 may be used to store heat for delivering to the heat exchanger 222. The water contained in the basin 288 is thus heated while a ship is docked, via a heat exchanger 296 and a heat transfer fluid circuit 298 connected to the network 268.

The re-gasification heat exchanger 222 can thus be fed with hot water coming either from the heat transfer fluid network 268 coming from the ship 200 while the ship is unloading, or else, when a ship 200 is not available for supplying this hot water, via the circuit 299 which is fed with the heated water stored in the basin 288.

Possibly by combining these two sources of hot water, and as a function of the requirements of the gas terminal 206, this architecture thus makes it possible to optimize the use of the heat supplied by the ship 200 while it is unloading.

Thus, for example, priority can be given to storing hot water in daytime by reducing the emission of gas from the gas terminal 206 to the pipeline 214 while the electrical energy needed for feeding the high pressure pump 220 of the gas terminal 206 is more expensive, and then increase said emission of gas during the night when the cost of electrical energy is lower, then delivering the heat needed for re-gasification by means of the heated water stored in the basin 288 during the day.

Figure 3:
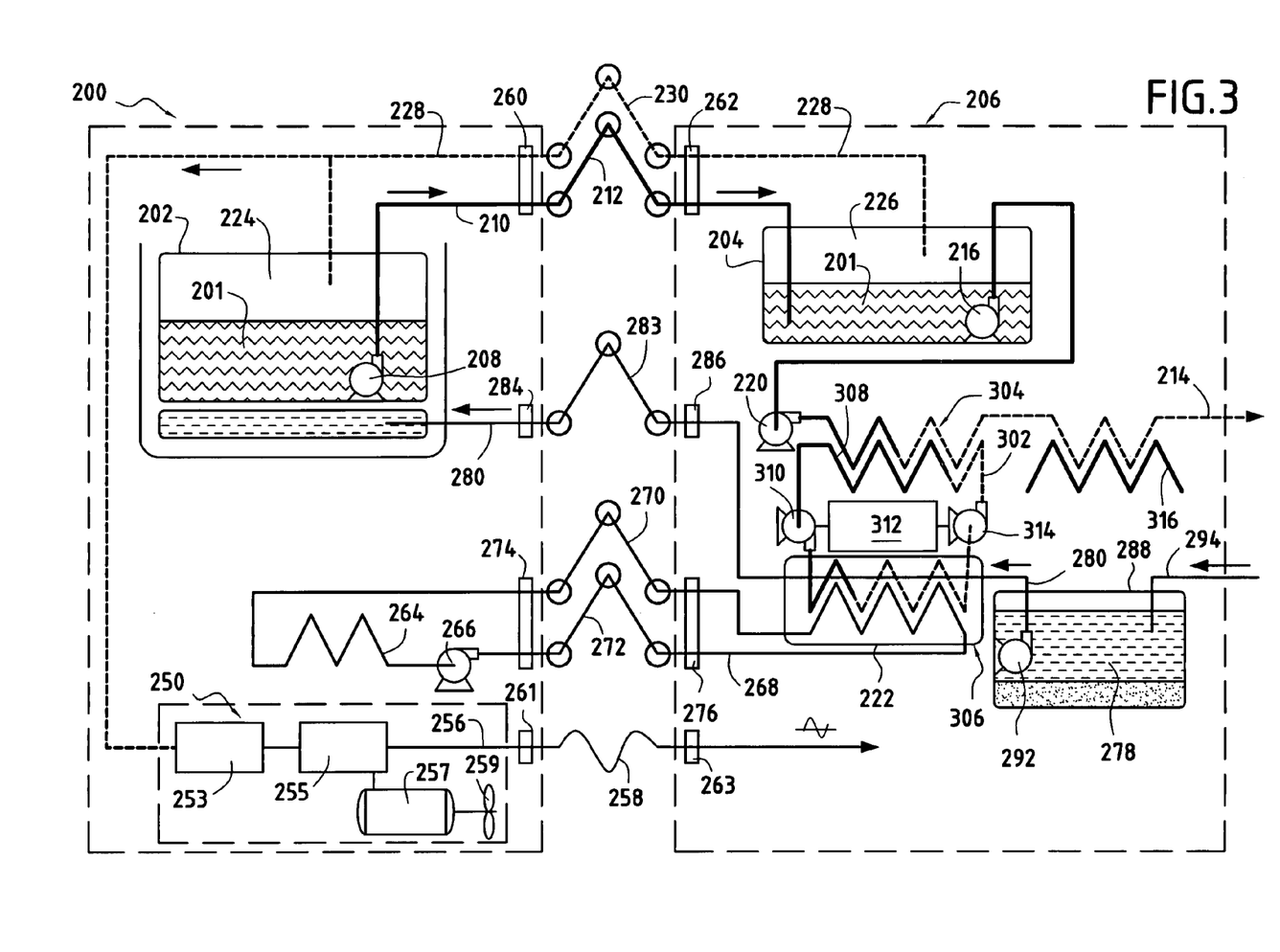
FIG. 3 shows a second variant of FIG. 1 including an energy recovery cycle.

FIG. 3 shows a second variant enabling the heat delivered by the ship 200 to be used to even greater advantage by means of a positive cycle for recovering energy as represented by a loop 302.

This energy recovery loop 302 is formed between a cold source 304 associated with the re-gasification of the liquefied gas and a hot source 306 associated with the heat exchanger 222. Thus, the cold source 304 is constituted by the heat absorbed by the liquefied gas while it is being re-gasified.

By way of example, the energy recovery loop 302 may be a Rankine cycle in which the cycle fluid is liquefied by the heat extracted by the liquefied gas in a heat exchanger and condenser 308, and is then pressurized by a pump 310 which can be located, for example, on the same shaft as an alternator 312 and a turbine 314.

The fluid of the loop 302 is then vaporized under pressure in the heat exchanger 222 by the heat transfer fluid circuit 268 coming from the ship 200, and is then expanded in the turbine 314 prior to returning to the heat exchanger/condenser 308.

Since the energy consumed by the pump 310 is less than that produced by the turbine 314, the cycle is positive and electricity can be supplied by the alternator 312 to the local network in the gas terminal.

The efficiency of this energy recovery loop is directly linked to the temperature of the vapor of the loop 302 at the inlet to the turbine 314, so it is advantageous for this temperature to be as high as possible, i.e. as close as possible to the maximum heat exchange temperature that can be delivered by the ship 200 which may be about 80° C. in a circuit 264 for cooling a diesel engine 253.

Heat can be delivered to the heat exchanger 222 initially using non-heated water 278 coming, for example, from the basin 288 via the ballast water circuit 280. This non-heated water 278 thus serves to vaporize the fluid of the loop 302 and then raise it substantially to ambient temperature. The water coming from the ship via the circuit 268 then serves to superheat the vapor of the loop 302 prior to the vapor expanding in the turbine 314.

In addition, a further heat exchanger 316 fed with optionally heated water can be disposed at the outlet from the cold source 304 so that the temperature of the gas, after it has been re-gasified, is sufficient to enable it to be injected directly into the pipeline 214. This additional heat exchanger 316 may be fed, for example, with the heat produced by the propulsion system 250 of the ship 200 or by the ballast water feed circuit 280.

Figure 4:
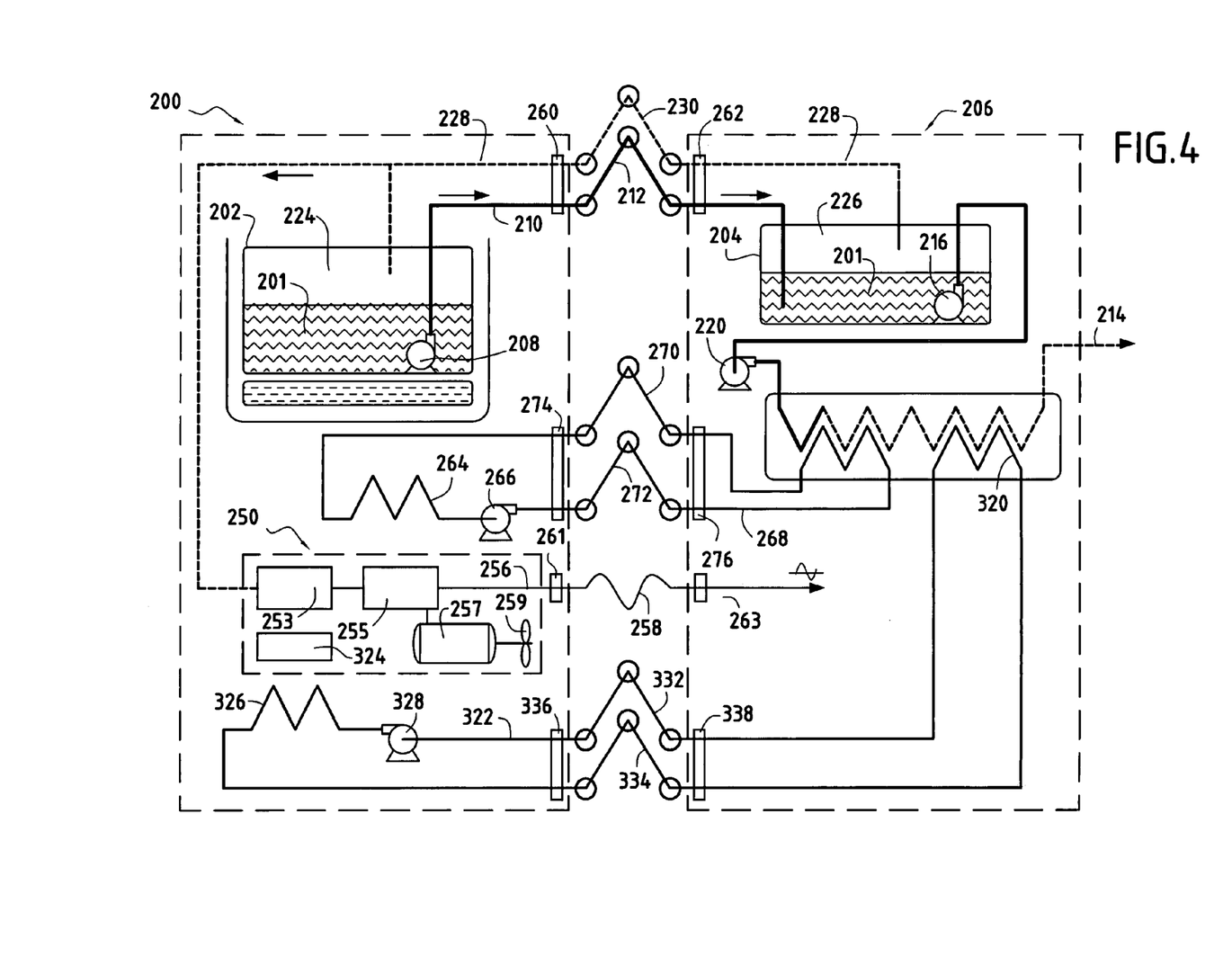
FIG. 4 shows a third variant of FIG. 1 including two heat exchangers.

FIG. 4 shows another variant including another heat exchanger 320 fed from a heat transfer circuit 322. This heat exchanger 320 may correspond, for example, to a second superheater stage added to the heat exchanger 222 of FIG. 1.

The heat produced by the exhaust gas 324 from the engine 253 of the propulsion system 250 of the ship 200 can be extracted by a cooling circuit 326 in order to be fed with the help of a pump 328 to the heat transfer fluid circuit 322.

Arms or hoses 332 and 334 are connected between a heat transfer fluid feed interface 336 on board the ship 200 and a heat transfer fluid receiving interface 338 at the gas terminal 206.

The heat collected from the exhaust gas 324 can rise the temperature of the heat transfer fluid to a temperature of about 150° C. Thus, the heat transfer fluid can itself be pressurized water, or steam, or oil, for example.

Figure 5:
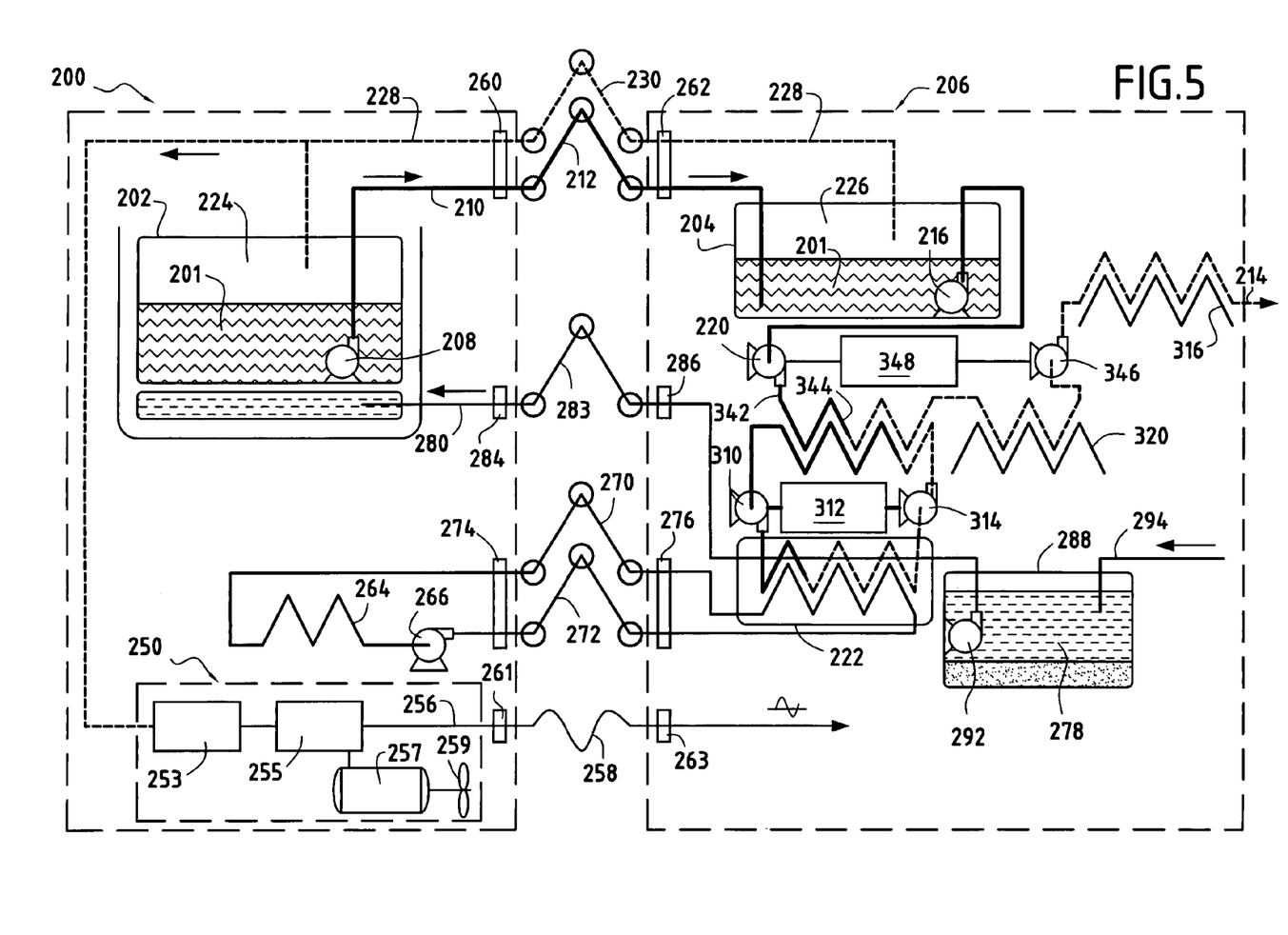
FIG. 5 shows a variant of FIG. 4 including two energy recovery cycles.

FIG. 5 shows a variant of FIG. 3 but includes another energy recovery circuit 342.

This example enables greater advantage to be taken of the cold source constituted by the liquefied gas being re-gasified, with the gas being raised by the pump 220 to a pressure higher than the pressure required by the pipeline 214.

Once the liquefied gas has been re-gasified in the heat exchanger 344, it can be superheated in another heat exchanger, for example in the heat exchanger 320 which is fed with the heat produced by the exhaust gas, as shown in FIG. 4.

The gas is subsequently expanded to the working pressure of the pipeline 214 in a turbine 346 which may either be coupled to an alternator (not shown) to deliver energy to the network, or else, as shown in FIG. 5, can be mounted on the same shaft as the engine 348 of the pump 220 so as to reduce its electricity consumption. This expansion leads to a drop in temperature, and thus the gas can be reheated substantially back to ambient temperature by the additional heat exchanger 316 prior to being admitted into the pipeline 214.

Figure 6:
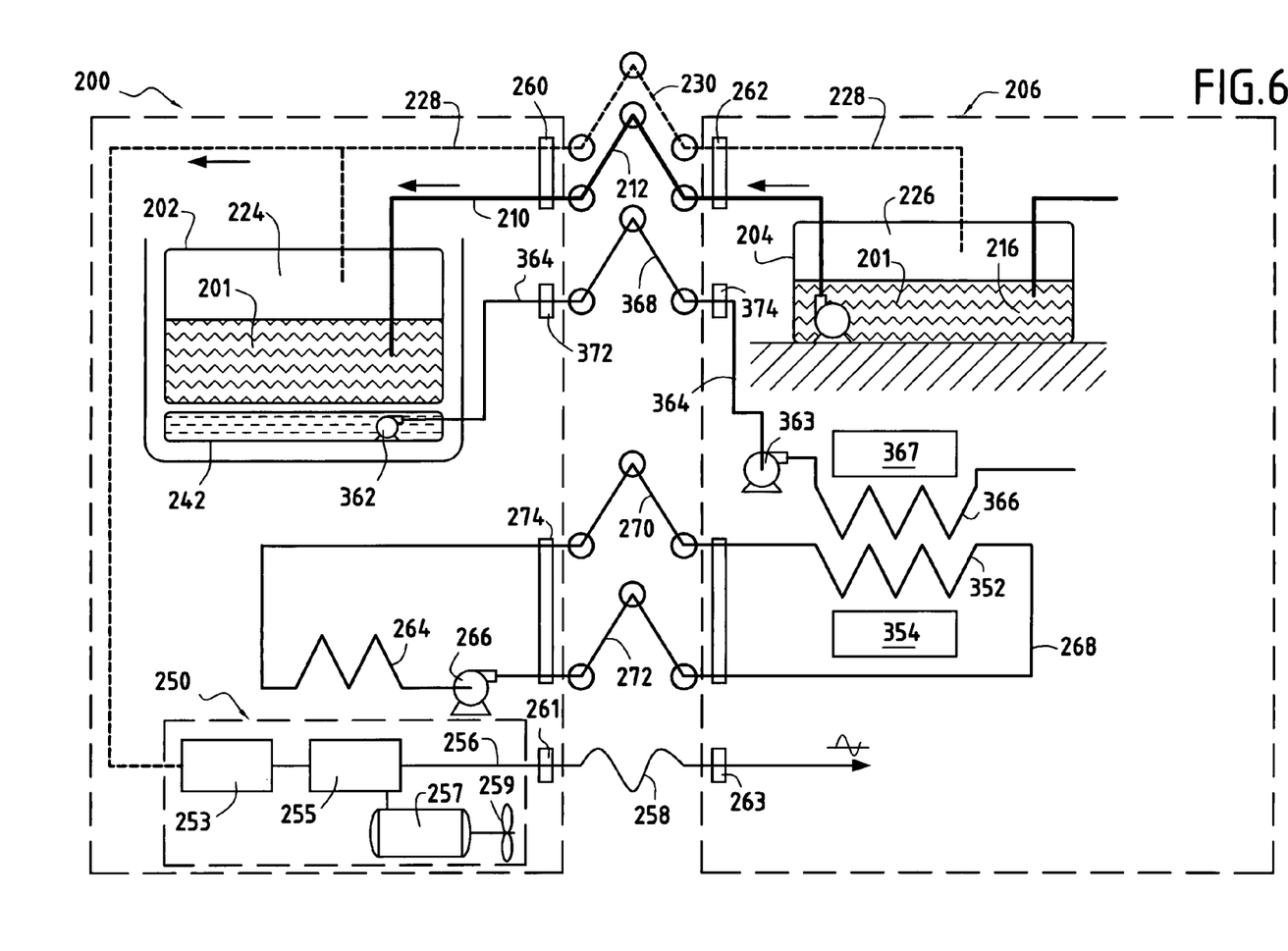
FIG. 6 is a highly diagrammatic view of a circuit in accordance with the invention for loading liquefied gas from a gas terminal onto a ship for transporting said liquefied gas.

FIG. 6 is a highly diagrammatic view of a circuit for loading liquefied gas from a gas terminal 206 for loading on board a ship 200 that transports the liquefied gas.

As in the preceding figures, the propulsion system 250 of the ship 200 is used as a co-generation unit for feeding the gas terminal 206 with heat and electricity.

The heat transported by the circuit 268 via the arms 270 and 272, is heat that is given off, for example, by a heat exchanger 352 for feeding to an installation 354 that consumes heat.

The above-described variants for storing said heat or for using various heat transfer fluids delivering heat at various temperatures can naturally be envisaged for use in this loading circuit.

Similarly, the electricity produced by the alternator(s) 255 of the ship 200 can be used for delivering power to the power network of the gas terminal 206 via the electrical circuit 256.

In addition, in this example, instead of rejecting water from the ballast tank 242 progressively into the sea in order to compensate for the loading of cargo, the ship 200 can deliver the water by means of a pump 362 and possibly 363 via a water circuit 364 to the gas terminal 206 where the water can be used as a cooling fluid in a heat exchanger 366, e.g. to the advantage of a cooling circuit 367 for a liquefaction installation or plant (not shown).

The water circuit 364 includes a loading arm or hose 368 connected between a ballast water interface 374 on board the ship 200 and a water interface 374 at the gas terminal 206.

If the ballast water is fresh water, it can optionally be delivered via additional pumps included in the terminal so as to raise it to a higher pressure enabling it to feed a local network used, for example, for irrigation purposes.

This use of ballast water as a cooling fluid, or as a source of fresh water, is particularly advantageous for loading gas terminals which are located in arid or desert zones.

What is claimed is:

1. A method of feeding energy to a gas terminal from a ship having a propulsion system and transporting liquefied gas while said liquefied gas is being transferred between a tank of the ship and a tank of the gas terminal, wherein
    a portion of energy produced by the propulsion system of the ship is supplied to the gas terminal; and
    heat produced by the propulsion system of the ship is used for feeding heat to at least one heat exchanger disposed in the gas terminal.

2. A method according to claim 1, wherein excess gas vapor in the gas ceiling of the tank of the ship and in the gas ceiling of the tank of the gas terminal is used for feeding the propulsion system of the ship.

3. A method according to claim 1, wherein a first heat exchanger is fed from a cooling circuit of the engine of the propulsion system of the ship.

4. A method according to claim 1, wherein a second heat exchanger is fed from a heat transfer circuit for taking heat from the exhaust gas of the engine of the propulsion system of the ship.

5. A method according to claim 3, wherein the heat given off by the first heat exchanger is used to re-gasify the liquefied gas after it has been unloaded from the ship's tank to the tank of the gas terminal.

6. A method according to claim 4, wherein the heat given of f by the second heat exchanger is used to re-gasify the liquefied gas after it has been unloaded from the ship's tank to the tank of the gas terminal.

7. A method according to claim 5, wherein at least one positive energy recovery cycle is formed between a cold source associated with the re-gasification and a hot source associated with the first heat exchanger.

8. A method according to claim 6, wherein at least one positive energy recovery cycle is formed between a cold source associated with the re-gasification and a hot source associated with the second heat exchanger.

9. A method according to claim 5, wherein, after being re-gasified, the gas is heated by an additional heat exchanger.

10. A method according to claim 1, wherein a determined portion of the electrical power supplied by the propulsion system of the ship is used for feeding electricity to the gas terminal.

11. A method according to claim 1, wherein the liquefied gas is liquefied natural gas.

12. A method according to claim 1, wherein the liquefied gas is liquefied petroleum gas.

13. A method of feeding energy to a gas terminal from a ship having a propulsion system and transporting liquefied gas while said liquefied gas is being transferred between a tank of the ship and a tank of the gas terminal, wherein a portion of energy produced by the propulsion system of the ship is supplied to the gas terminal; while liquefied gas is being unloaded from the ship to the gas terminal, ballast tanks of the ship are filled with water supplied by the gas terminal.

14. A method according to claim 13, wherein the water supplied by the gas terminal is sea water that has settled in a basin.

15. A method according to claim 13, wherein the water supplied by the gas terminal is fresh water stored in a basin.

16. A method according to claim 13, wherein the water supplied by the gas terminal is used for feeding the heat exchanger with heat for the purpose of re-gasifying the liquefied gas.

17. A method according to claim 14, wherein the heat produced by the propulsion system of the ship is used for heating the water in the basin so that the basin can be used to store heat.

18. A method according to claim 17, wherein the heat stored in the water basin is used in the gas terminal to re-gasify the liquefied gas.

19. A method of feeding energy to a gas terminal from a ship having a propulsion system and transporting liquefied gas while said liquefied gas is being transferred between a tank of the ship and a tank of the gas terminal, wherein a portion of the energy produced by the propulsion system of the ship is supplied to the gas terminal; and while liquefied gas is being loaded from the gas terminal onto the ship, water present in the ballast tanks of the ship is delivered to the gas terminal.

20. A method according to claim 19, wherein the water delivered to the gas terminal is used as a cooling fluid in a heat exchanger in the gas terminal.

21. A method according to claim 20, wherein the heat exchanger is used in a cooling circuit of a liquefaction installation.

22. A ship including a tank for transporting liquefied gas, a propulsion system, and means for transferring the liquefied gas between the tank of the ship and a tank of a gas terminal, the ship further comprising at least one interface for feeding a heat transfer fluid to supply heat to the gas terminal.

23. A ship according to claim 22, wherein a first heat transfer fluid feed interface is used to cause the cooling fluid of the engine of the ship's propulsion system to circulate through a first heat exchanger disposed in the gas terminal.

24. A ship according to claim 22, wherein a second heat transfer fluid feed interface serves to cause the cooling fluid for cooling the exhaust gases from the engine of the ship's propulsion system to circulate through a second heat exchanger disposed in the gas terminal.

25. A ship according to claim 22, further comprising a ballast water interface enabling water to be transferred between the ship and the gas terminal.

26. A ship according to claim 22, further comprising an interface for supplying electrical power that enables the gas terminal to be fed with electricity.

27. A gas terminal comprising at least one tank for storing liquefied gas and transfer means for transferring the liquefied gas between said tank and a tank of a ship for transporting liquefied gas, the terminal further comprising at least one interface for receiving a heat transfer fluid from the ship.

28. A gas terminal according to claim 27, further comprising a water interface enabling water to be transferred between the ship and the gas terminal.

29. A gas terminal according to claim 27, further comprising an interface for receiving electrical power enabling the gas terminal to be fed with electricity from the ship.

* * * * *